(12) United States Patent
Ruhl et al.

(10) Patent No.: US 6,361,892 B1
(45) Date of Patent: Mar. 26, 2002

(54) ELECTROCHEMICAL APPARATUS WITH REACTANT MICRO-CHANNELS

(75) Inventors: Robert C. Ruhl, Cleveland Heights; Christopher E. Milliken, South Euclid; Michael A. Petrik, Highland Heights, all of OH (US)

(73) Assignee: Technology Management, Inc., Cleveland, OH (US)

( * ) Notice: Subject to any disclaimer, the term of this patent is extended or adjusted under 35 U.S.C. 154(b) by 0 days.

(21) Appl. No.: 09/455,149

(22) Filed: Dec. 6, 1999

(51) Int. Cl.[7] .......................... H01M 8/10; H01M 8/04; H01M 4/86; H01M 4/88
(52) U.S. Cl. ..................... 429/30; 429/32; 429/38; 429/39; 429/40
(58) Field of Search .................. 429/30, 32, 34, 429/38, 39, 40; 427/115; 29/623.1, 623.5

(56) References Cited

U.S. PATENT DOCUMENTS

| | | | |
|---|---|---|---|
| 3,764,391 A | * 10/1973 | Warszawski et al. | |
| 4,037,023 A | * 7/1977 | Grehier et al. | 429/12 |
| 4,499,663 A | 2/1985 | Zwick et al. | 29/623 |
| 4,510,212 A | 4/1985 | Fraioli | 429/30 |
| 4,910,100 A | * 3/1990 | Nakanishi et al. | 429/32 |
| 5,102,750 A | * 4/1992 | Taylor | 429/30 |
| 5,116,696 A | 5/1992 | Barp | 429/26 |
| 5,198,312 A | 3/1993 | Irino et al. | 429/26 |
| 5,212,023 A | 5/1993 | Diethelm | 429/26 |
| 5,236,687 A | * 8/1993 | Fukuda et al. | 429/44 X |
| 5,256,499 A | 10/1993 | Minh et al. | 429/33 |
| 5,264,300 A | 11/1993 | Barp et al. | 429/30 |
| 5,269,902 A | 12/1993 | Khandkar et al. | 204/426 |
| 5,340,664 A | 8/1994 | Hartvigsen | 429/20 |
| 5,376,472 A | 12/1994 | Hartvigsen et al. | 429/32 |
| 5,399,442 A | * 3/1995 | Shundo | 429/32 |
| 5,470,671 A | 11/1995 | Fletcher et al. | 429/26 |
| 5,514,486 A | 5/1996 | Wilson | 429/30 |
| 5,549,983 A | 8/1996 | Yamanis | 429/32 |
| 5,595,834 A | 1/1997 | Wilson et al. | 429/30 |
| 5,635,039 A | 6/1997 | Cisar et al. | 204/252 |
| 5,683,828 A | 11/1997 | Spear et al. | 429/13 |
| 5,716,437 A | * 2/1998 | Denton et al. | 429/40 X |
| 5,747,185 A | 5/1998 | Hsu | 429/44 |

FOREIGN PATENT DOCUMENTS

| | | | |
|---|---|---|---|
| DE | 3922673 A1 | 1/1991 | H01M/8/12 |
| DE | 196 37 655 C1 | * 11/1997 | |
| EP | 222880 B1 | 5/1987 | C25D/5/02 |
| EP | 0 355 420 A1 | 2/1990 | H01M/8/24 |
| EP | 549695 B1 | 7/1993 | H01M/8/24 |
| GB | 2219125 A | 11/1989 | H01M/8/12 |
| GB | 2318 447 A | 4/1998 | H01M/8/24 |
| JP | 58-164156 A | * 9/1983 | |
| JP | 11-045727 A | * 2/1999 | |
| JP | 11-283639 A | * 10/1999 | |

OTHER PUBLICATIONS

Derwent Abstract of DE 3922673, (Jan. 1991).

* cited by examiner

Primary Examiner—Gabrielle Brouillette
Assistant Examiner—Jonathan Crepeau
(74) Attorney, Agent, or Firm—Renner, Kenner, Greive, Bobak, Taylor & Weber

(57) ABSTRACT

The present invention is directed generally to an electrochemical apparatus for oxidation or consumption of a fuel, and the generation of electricity, such as, a solid electrolyte fuel cell. The electrochemical apparatus (1) comprises at least one cell (2), wherein the cell (2) has a solid electrolyte (10) disposed between an oxygen electrode (8) and a fuel electrode (12), and at least one separator (6) contacting the surface of one of the electrodes (13) opposite of the electrolyte (10). At least one electrode (13) of the cell (2) defines a micro-channel pattern (26), wherein the micro-channel cross-section is preferably varied, such that reactant gas flowing through the micro channels achieves tailored local flow, pressure, and velocity distributions.

48 Claims, 2 Drawing Sheets

ELECTROCHEMICAL APPARATUS WITH REACTANT MICRO-CHANNELS

TECHNICAL FIELD

The present invention relates to fuel cells, and more particularly to fuel cells constructed of stacked plate components. More particularly, the present invention relates to fuel cells containing enhanced flow electrodes for fuel and/or air.

BACKGROUND OF THE INVENTION

The invention is directed generally to an electrochemical apparatus for oxidation or consumption of a fuel, and the generation of electricity, such as, a solid electrolyte fuel cell.

Although particular embodiments are applicable to conventional co-fired solid electrolyte fuel cell apparatus, the present invention is particularly useful when utilizing non-cofired solid oxide electrolyte fuel cells, preferably planar fuel cells, that contain a stack of multiple assemblies. Each assembly comprises a solid electrolyte disposed between a cathode and an anode, being bounded by separators, which contact the surfaces of the electrodes opposite the electrolyte.

The fuel cell operates by conducting ions through the electrolyte. For solid oxide fuel cells in particular, oxygen or air is introduced at the cathode, and ionization of oxygen occurs at the cathode/electrolyte surface. The oxygen ions move across the gas non-permeable electrolyte to the anode interface, where it reacts with the fuel flowing into the anode at the anode/electrolyte interface, releasing heat and supplying electrons to the anode. Distribution of the air and fuel reactants is typically performed by a manifold assembly within the fuel cell apparatus.

Conventionally, each reactant is supplied through a flow conduit to the appropriate electrode, and distribution to the electrode/electrolyte interface is accomplished by internal porosity and/or grooved channels.

Minh, U.S. Pat. No. 5,256,499, discloses a monolithic fuel cell having an integrally formed manifold constructed by corrugations formed within the anode and cathode with aligned ribs and columns arranged to force fuel and oxidant along aligned pathways. Reactants are fed from the sides of the fuel cell and travel along these pathways.

Hsu, U.S. Pat. No. 5,747,485, discloses a conductor plate for a solid oxide fuel cell with ridges extending therefrom. These ridges form grooves used to channel reacting gases out of the cell.

Datta, U.K. Patent No. 2,219,125A discloses an electrolyte with a three-dimensional groove arrangement used to control hot spots within the electrolyte block.

Hsu, Minh and Datta employ external manifolding and rectangular geometries driving the reactants from one side of the cell to the other. Despite the use of channels, reactants entering from a single side of the cell deplete as they travel across the cell. Further, when reactants are fed externally from more than one side, the flows converge creating localized areas of increased reaction. The increased number of reactions generates an undesirable thermal gradient, which can damage the cell.

Moreover, Hsu, Minh and Datta employ grooves of uniform cross section along the length of these grooves. These grooves are essentially pathways within the cell, and fail to control gas flow rate or pressure distribution. The flow rate is controlled at its source and not tailored or controlled within the cell.

In fuel cells which have their anode fuel-exit edges exposed to an oxidizing environment, any anode local exit regions having low fuel mixture velocities may allow oxygen back diffusion into the cell stack, causing premature combustion and loss of active anode area. The electrochemical processes inherent in the fuel cell's operation become less effective and performance suffers.

Custom flow pattern design is desirable to achieve substantially uniform reactant concentration distribution within the cell and from cell to cell within a stack, which also helps minimize unnecessary and undesirable thermal gradients within the cell.

It is an object of the present invention, therefore, to provide a compact, centrally fed radial fuel cell utilizing micro-channels to tailor the flow distribution of reacting gases within the fuel cell and amongst all the cells in a stack.

It is another object of the present invention, to provide a compact fuel cell utilizing variable cross-section micro-channels to tailor the flow, pressure, and velocity distribution of reacting gases within the fuel cell and amongst all the cells in a stack.

It is a further object of the present invention to provide an enhanced flow electrode produced by simple scalable production techniques.

SUMMARY OF THE INVENTION

We have found that micro-channels integrated within the electrode structure can be formed in a compact fuel cell. Integrated micro-channels minimize the complexity of stack components. Channels of smaller dimension than those existing in the prior art can be manufactured by a variety of techniques. Using these techniques, flow and pressure distribution can be customized and controlled through the channel design, enhancing reactant distribution to the cell. It has further been found that a fuel cell apparatus employing a network of micro-channels can improve overall cell reactant balance through controlled pressure distribution. It has further been found that employing controlled flow and pressure in a compact integrated device results in an apparatus exhibiting improved volumetric power density and efficiency.

The present invention therefore provides an electrochemical apparatus comprising at least one cell, wherein the cell has a solid electrolyte disposed between an oxygen electrode and a fuel electrode, with at least one separator between adjacent cells contacting the surface of one of the electrodes opposite the electrolyte; wherein at least one electrode of the cell defines a variable cross-section micro-channel pattern, wherein this pattern serves to distribute the flowing gas uniformly within the electrode, regulates the pressure drop of this gas, and also creates preferred local gas velocities, especially where the gas exits the electrode.

The present invention further provides an electrochemical apparatus comprising at least one cell, having a solid electrolyte disposed between an oxygen electrode and a fuel electrode; and at least one separator contacting the surface of one of the electrodes opposite the electrolyte. In one embodiment, at least one separator preferably defines a micro-channel pattern; wherein the micro-channel pattern narrows towards the cell rim, such that gas flowing out the rim is accelerated.

The micro-channel is preferably a small size, on the order of about 0.5 millimeter or less, such that the micro-channel can be defined within at least one electrode or separator by low-cost manufacturing techniques.

The present invention also provides an electrochemical apparatus comprising an electrode defining a pattern of micro-channels for directing the flow of reactant; wherein the cross sectional area of the micro-channels is varied along the micro-channel length.

The present invention also provides an electrochemical apparatus comprising a plurality of cells forming a stack; each cell within the stack has a solid electrolyte disposed between an oxygen electrode and a fuel electrode, with at least one separator contacting the surface of one of the electrodes opposite the electrolyte. In substantially each of these cells, at least one electrode defines a variable cross-section micro-channel pattern.

The present invention also provides an electrochemical apparatus comprising at least one cell having a solid electrolyte disposed between an oxygen electrode and a fuel electrode, and at least one separator contacting the surface of one of the electrodes opposite the electrolyte; wherein at least one electrode or the electrolyte or the separator surface has a plurality of columns extending therefrom; said columns defining variable cross-section micro-channels therebetween.

The present invention also provides an electrochemical apparatus comprising at least one circular cell having a cell rim; said cell has a solid electrolyte layer disposed between an oxygen electrode layer and a fuel electrode layer; at least one separator layer contacting the surface of one of the electrodes opposite the electrolyte; wherein each of the layers define at least one air hole and at least one fuel hole and wherein the respective holes in each layer are registrable with one another and define generally central internal air and fuel manifolds; wherein at least one layer has a plurality of circular columns extending longitudinally outwardly from the respective air or fuel manifold, defining a micro-channel pattern. Preferably, the columns are arranged in radially expanding rows; and an increasing number of columns extend from said at least one layer in each of said rows, such that said columns define a variable cross-section micro-channel that narrows toward the cell rim.

The present invention also provides an electrochemical apparatus comprising at least one fuel cell, wherein the cell has a solid electrolyte disposed between an oxygen electrode and a fuel electrode, and at least one separator contacting the surface of one of the electrodes opposite the electrolyte; wherein the cell defines at least one air manifold and at least one fuel manifold located substantially centrally within the cell; and at least one of the electrodes defines a micro-channel pattern.

The present invention further provides, in a process for the fabrication of a solid oxide fuel cell comprising at least one cell having a cell rim, wherein said cell has a solid electrolyte layer disposed between an oxygen electrode layer and a fuel electrode layer, and at least one separator layer contacting the surface of one of the electrodes opposite said electrolyte; wherein each of the layers define at least one air hole and at least one fuel hole and wherein the respective holes within each layer are registerable with one another and define generally central internal air and fuel manifolds; the improvement including providing reactant micro-channels in at least one layer, said micro-channels having a width of not more than about 0.5 mm.

The micro-channel patterns may be fabricated by a variety of known fabrication methods. One preferred method is the use of mechanical pressing.

DETAILED DESCRIPTION OF THE INVENTION

Figure 1:
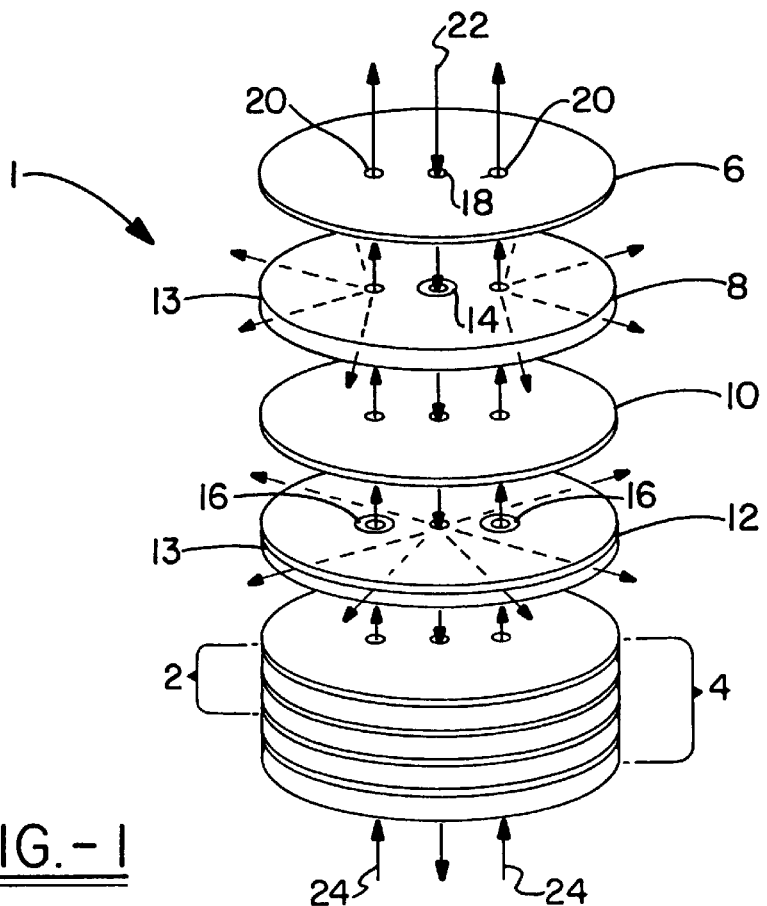
FIG. 1 is a partially schematic, partially exploded side view of fuel cells capable of having an enhanced flow micro-channel pattern in one of the layers according to the present invention.

Although applicable to other types of electrochemical apparatus, for purposes of this description the invention will be described in relation to its incorporation into a solid electrolyte (oxide) fuel cell as described in U.S. Pat. No. 5,445,903, incorporated by reference as if reprinted herein. The electrochemical apparatus 1 of one embodiment of the present invention is represented in FIG. 1, which shows a schematic exploded view of one preferred embodiment of a solid-oxide fuel cell 2 and a stack of two such cells 4.

A cell 2 generally comprises four stacked layers: a separator 6, a cathode layer 8, an electrolyte 10, and an anode layer 12. Cathode layer 8 and anode layer 12 may be referred to in the general sense as electrodes 13. A tubular gasket 14 in a cathode layer forms a seal between the separator and electrolyte. A pair of tubular gaskets 16 in the anode layer form seals between the electrolyte and separator. Gaskets 14 and 16 must remain impervious to fuel and air respectively at the relatively high operating temperature of the cell and must be capable of maintaining a good seal under cell operating conditions. Suitable gaskets 14 and 16 can be made from oxidation resistant metal alloys such as nickel-base alloys, from ceramics, or from glasses or glass-ceramics having suitable softening temperatures.

Figure 3:
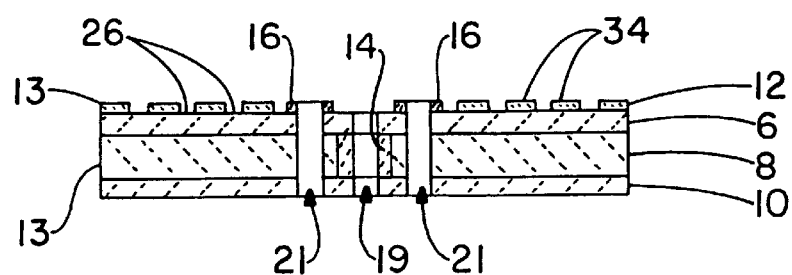
FIG. 3 is a partially schematic sectional side view of a cell according to the present invention as seen along line 3—3 in FIG. 2.

As shown in FIGS. 1 and 3, the separator contains an internal fuel hole 18, which is aligned with corresponding holes in the other cell layers to form an internal fuel manifold 19. It also contains a pair of internal air holes 20, which are aligned with corresponding holes in the other cell layers to form a pair of internal air manifolds 21. It is within the scope of the invention to include single or multiple fuel passages and/or oxygen passages in various locations within the cell, preferably close to the centerline of the cell.

A suitable hot fuel gas mixture 22, represented by an arrow, is fed to the internal fuel manifold 19 and hot air 24, represented by arrows, is fed to both internal air manifolds 21. The stack of fuel cells will typically operate at about 850° to 1000° C., but may operate as low as 600° C. with suitable low-temperature solid electrolytes.

The separators 6 must be impervious to gases, be good conductors of electrons, and have long-term compatibility with both the adjacent material and with the air and fuel mixtures. They should also be fairly good conductors of heat. Suitable materials include doped lanthanum chromite or high-temperature metallic alloys, such as RA330, Ducralloy, Inconel 601, or Haynes 230 available from Rolled Alloys, Plansee, Inco Alloys International, and Haynes respectively.

The porous cathode layer or oxygen electrode 8, is generally made of a mixed oxide preferably such as strontium-doped lanthanum manganite (LSM). The electrolyte 10 is impervious to gases and is a good oxygen ion conductor while having little or no electronic conductivity. Yttria-doped zirconia having about 6 to 10 mole percent $Y_2O_3$ is preferred. The electrolyte 10 is preferably coated with a thin, fired layer of LSM on the cathode side and nickel oxide/doped ceria on the anode side.

The porous anode layer or fuel electrode 12 is preferably made of nickel felt, nickel-zirconia cermet, or other nickel-containing cermet or alloy.

Cell and stack diameters are typically about 50 to about 80 mm and total cell thickness (in use) is typically about 1 to about 2 mm, but can be of slightly larger diameter.

When the cells 2 are stacked, a series electrical connection is established among all the cells in the stack, such that the stack voltage is the sum of all the cell voltages. In use, a stack is clamped between a pair of high-temperature electrical contact blocks equipped with mating holes for feeding gaseous fuel and air via feed tubes (not shown). At one end of the stack, the separator 6 is omitted and, thus, the stack is bounded by a cathode layer 8 at one end and an anode layer 12 at the other end. The fuel gas and air may be fed into opposite ends or the same ends of the stack.

The stack is operated by preheating the apparatus close to operating temperature, supplying air and fuel gas, and connecting an external electric load. Oxygen from the air is ionized at, or near, the cathode-electrolyte interface. The oxygen ions flow through the electrolyte under the influence of the chemical potential difference. At, or near, the electrolyte-anode interface the oxygen ions combine with fuel molecules (chiefly hydrogen and carbon monoxide), releasing electrons which flow into the next cell. Typical power densities are on the order of about 150 mW/cm$^2$ of electrode area at typical cell operating voltages near about 0.7 volts. Typical stack volumetric power densities are close to about 1.0 kilowatt/liter.

The cathode layer 8 is preferably a porous body having a thickness in the range of about 0.2 to about 0.6 mm, and composed of conventional cathode material, most preferably an oxide having the perovskite crystalline form such as strontium doped lanthanum manganite ($LaMnO_3$), doped calcium manganite ($CaMnO_3$), lanthanum chromite ($LaCrO_3$), lanthanum cobaltite, ($LaCoO_3$), lanthanum nickelite ($LaNiO_3$), lanthanum ferrite ($LaFeO_3$), or mixtures thereof. The cathode 8 may comprise mixed ionic/electronic conductors such as an appropriately doped perovskite oxide listed above. The cathode 8 can be prepared by conventional ceramic processing procedures for making a flat, planar structure, including pressing a powder, or extruding or tape casting a green body, and sintering either prior to or during the initial operation of the apparatus.

Electrolyte 10 is a thin wafer, generally less than about 0.4 mm thick, preferably about 0.2 mm or less of conventional solid oxide fuel cell electrolyte material. Representative electrolytes include zirconia ($ZrO_2$) stabilized with 6 to 10 mole percent of yttria ($Y_2O_3$), doped cerium oxide, doped bismuth oxide, and oxide ion conducting perovskites. Electrolyte 10 is substantially impervious to gases, however, ionized oxygen can migrate through the electrolyte under the influence of applied oxygen potential.

The quality of the electrical contact between the cathode 8 and the electrolyte 10 may be improved by initially applying a thin layer of substantially the material that comprises the cathode 8 (or is at least electrochemically compatible with the cathode) to the surface of the electrolyte 10 adjacent the cathode 8 in the form of a paint or ink including a volatile vehicle to form an electrical contact zone. Likewise, a paint or ink containing substantially anode material such as nickel or nickel oxide may be applied to the surface of the electrolyte adjacent the anode to form such an electrical contact zone. This electrolyte surface coating may be applied by other conventional techniques also, such as plasma deposition, spin casting, spraying, or screen printing.

The thickness of the electrolyte surface coatings is generally on the order of about 1 to less than about 100 microns, and preferably less than 50 microns. It has been found that the thicker this surface coating is applied, the less gas is able to contact the electrolyte 10, and the more tendency there is for the coating to peel off. Unless specifically stated to the contrary, the electrolyte 10 as mentioned in this Specification shall mean the electrolyte 10 with or without either or both cathode and anode material surface coatings.

Anode 12 is a porous body, and may comprise conventional solid oxide fuel cell anode material. Preferably, the anode comprises either nickel felt or else a finely divided, compressed metallic powder such as nickel blended with a stable oxide powder such as zirconia, cation-doped ceria. As described above regarding the cathode 8, the anode 12 may comprise a mixed conductor, optionally combined with an electronically conducting material. Other examples include ceria, which can be doped with an oxide of lanthanum, zirconium or thorium, optionally containing an electronically conducting phase such as Co, Ru, or Pt. The thickness of the anode is preferably about 0.1 mm to about 0.5 mm. Like cathode 8, anode 12 may be sintered during cell operation or before initial operation in an overheating sintering step.

Figure 2A:
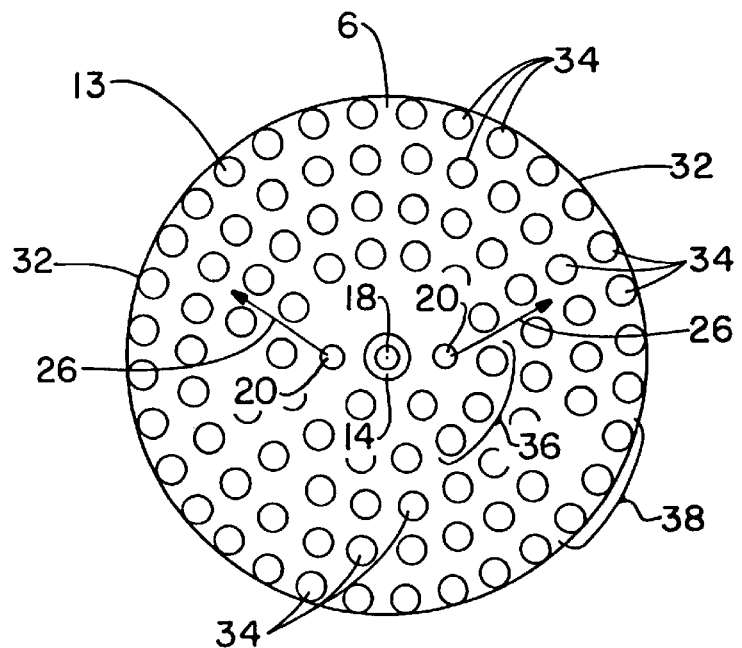
FIGS. 2A and 2B are plan views of enhanced flow micro-channel containing electrodes according to the present invention.

In the preferred embodiment as shown in FIG. 2A, at least one electrode 13 defines a plurality of micro-channels 26, as necessary. In the alternative, the separator 6 might define the micro channels 26 on either or both of its surfaces. Since the separators contact the anode and cathode surfaces, micro-channels 26 defined within the separator surfaces would also provide reactant channeling. For sake of simplicity, the description, while referring to electrode micro-channels, encompasses micro-channels formed within the separator 6 as well.

As shown in FIG. 2A, micro-channels 26 may be formed within an electrode 13. These micro-channels 26 create a preferential path for reactant flow across the electrode 13. As shown, in simplified form, a micro-channel 26 may be defined by a quantity of regularly spaced circular columns 34 extending between surfaces of adjacent layers. (Although circular columns are preferred, columns of other geometries may be utilized to provide customized flow characteristics.) The spaces between the columns 34 provide a preferential path for gas flow. Using cathode 8 as an example, air enters the micro-channel 26 from internal air manifold 21 via air holes 20. Gaskets or seals 14 isolate the air from fuel manifolds 19 and fuel hole 18 formed within cathode 8. The entering gas spreads outwardly amongst the columns 34 of electrode material, successively passing the columnar rows from inner row 36 to outer row 38 before exiting at the rim 32. It should be understood that a preferred pattern of columns 34 would utilize many more columns than shown in the simplified figure, with each column having a diameter on the order of about 1 mm or less. The height of each column 34 is generally on the order of about 0.05 mm to about 0.4 mm, preferably about 0.1 mm. It should be appreciated that the depth of micro-channels 26 may comprise substantially the entire thickness of the electrode 13.

The preferred pattern may be designed to control flow distribution within a cell 2 by defining pathways that offer reduced resistance in comparison with the surrounding material. The flow distribution may be further controlled by the number, size, or arrangement of the micro-channels 26 within the cell 2.

The preferred pattern is designed with consideration to the column spacing and the contact-area percentage. Column spacing may be relatively wide to help minimize the cell pressure drop. Pressure is controlled by the size of the column (diameter) and the number of columns per square centimeter. The column diameter and the contact-area percentage may be selected by a compromise between minimizing electrical resistance, achieving good reacting gas distribution to and from the active electrode sites, achieving the target pressure drop within a minimum pattern thickness, and fabrication limitations, if any.

The pattern may be designed to achieve a specific overall pressure drop at its design gas flow rate. It is also possible to manufacture a pattern with a desired lack of symmetry, to account for any expected side-to-side temperature difference within the stack, for example. Both the column shape and pattern layout may vary to produce the desired result. While the columns are shown in the Figures to be of a circular cross section, it is within the scope of the invention that the columns be formed with other cross sectional shapes, such as ovals, squares, rectangles, and other regular or irregular polygonal shapes. It should further be understood that in addition to columnar patterns, continuous channels may be formed within electrode 13 including grid channels, spiral channels, and radial line channels. The distribution of flow and achievement of a desired pressure drop may be controlled by using these types of channels as described above.

At the stack level, the flow distribution along the length of the stack may similarly be controlled by varying the number, size, and distribution of micro-channels 26 in different cells in accordance with the desired stack-wide distribution of reactants.

Figure 2B:
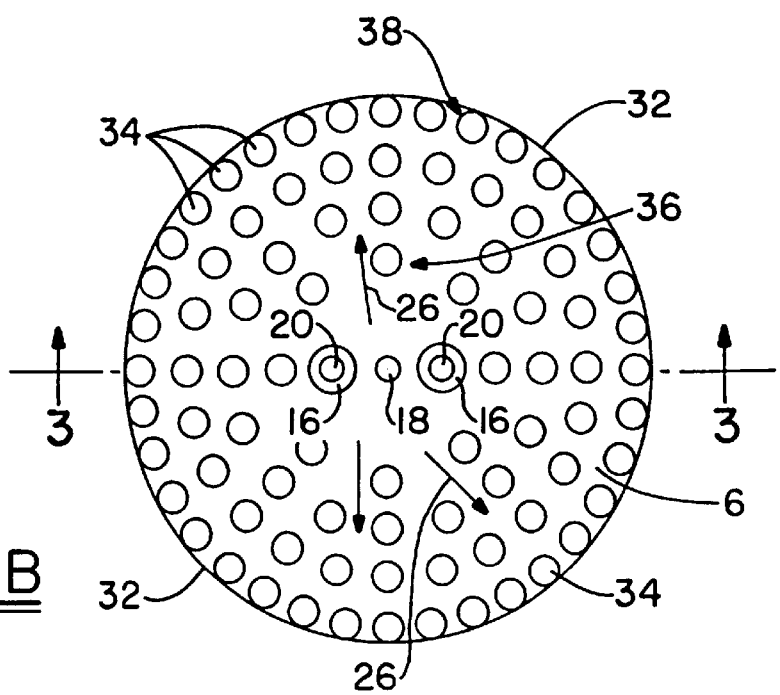

FIG. 2B is a simplified schematic illustration of an example fuel electrode 12 micro-channel pattern with variable cross-section flow channels formed on a separator 6. The pattern consists of a quantity of circular posts or columns 34 with open spaces between them where the gas flows. The fuel gas is fed into the micro-channel 26 pattern from fuel manifold 19 via a fuel hole 18. Seals 16 isolate the fuel from air manifolds 21 and air holes 20. The gas flows outwards amongst the columns, first passing the inner row of columns 36 and finally the outer row of columns 38 before exiting at the rim 32. The preferred pattern would utilize many more columns than shown in this simplified figure, with each column having a diameter on the order of about 1 mm or less. The preferred height of each column is very short, on the order of about 0.1 mm.

Using variable cross-section micro-channels, the preferred pattern would be designed using several considerations as follows. The column spacing would be relatively wide near the center of the cell, where the gas flow diameter is small, to help minimize the cell pressure drop. The spacing would be relatively narrow near the rim of the cell in order to achieve a good gas exit velocity, thereby preventing the surrounding gas mixture from diffusing backwards into the cell. The diameter of the columns and their contact-area percentage based on the area of the adjacent layer would be selected as a compromise between minimizing electrical resistance, achieving good reactant gas distribution to and from the active electrode sites, achieving the target pressure drop with a minimum pattern thickness, and fabrication limitations, if any. If the inner row of columns were arranged in a circular pattern as shown, good circumferential symmetry of gas flow could be achieved even when the center cavity is non-circular.

The pattern may be designed to achieve a specific target overall pressure drop at its designed gas flow rate. It would also be possible to manufacture a pattern with a desired lack of circular symmetry, if so wished due to an expected side-to-side temperature difference of the stack, for example. Both the column shape and the pattern layout could vary in many different ways as still be able to produce the desired results. Additionally, the thickness or height of the pattern might be varied from center to rim as another means for tailoring local flow, pressure, and velocity. It should be understood that micro-channels 26 may comprise substantially the entire thickness of the electrode.

It should further be understood that in addition to columnar patterns, continuous channels may be formed within electrodes 13. Some examples include, grid channels, spiral channels, and radial line channels. In a manner similar to the patterns, the flow, pressure, and velocity of reactants may be controlled by varying the cross-section of these channels.

The micro-channels 26 may be fabricated into the surface of electrode 13, electrolyte 10 or separator 6 by a variety of conventional subtractive techniques including electrical-discharge machining, stamping, laser ablation, chemical etching, ultrasonic etching, scribing, and grinding. As a benefit of the present invention, the micro-channels 26 may be formed by photolithography, pressing, calendering, micro electro mechanical systems (MEMS) techniques, or additive deposition techniques, air brush painting, stenciling, or screen printing. MEMS techniques include microetching, and micro- or nano-machining. The use of these techniques is possible because of the electrode 13 and micro-channel 26 size. The micro-channels may be formed by additive or subtractive techniques as set forth above, as applied to an electrode, electrolyte or separator. Material can be removed from the surface of one of the layers to provide the micro-channel, or material can be added to the surface of at least one of the layers. For example, electrode material can be deposited on the electrode, or the adjacent separator or electrolyte surface, to form columns which define the micro-channels as the space therebetween.

In the electrodes, the pillars 34 or micro-channels 26 are preferably made by uniaxially pressing a pattern into an unfired electrode preform. This preform is made of electrode powder or premixed ceramic-metallic powders mixed with an organic binder material. This combination of components is processed into a soft, ductile mixture having a dough-like consistency that can be easily pressed into a variety of shapes. The mixture is sufficiently rigid, however, to retain any impressed pattern including columns 34 and micro-channels 26.

Figure 4:
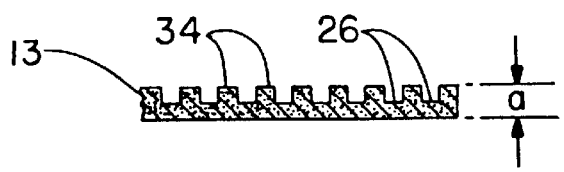
FIG. 4 is a partially schematic sectional side view of an enhanced flow electrode containing micro-channels according to another embodiment of the present invention.
Figure 5:
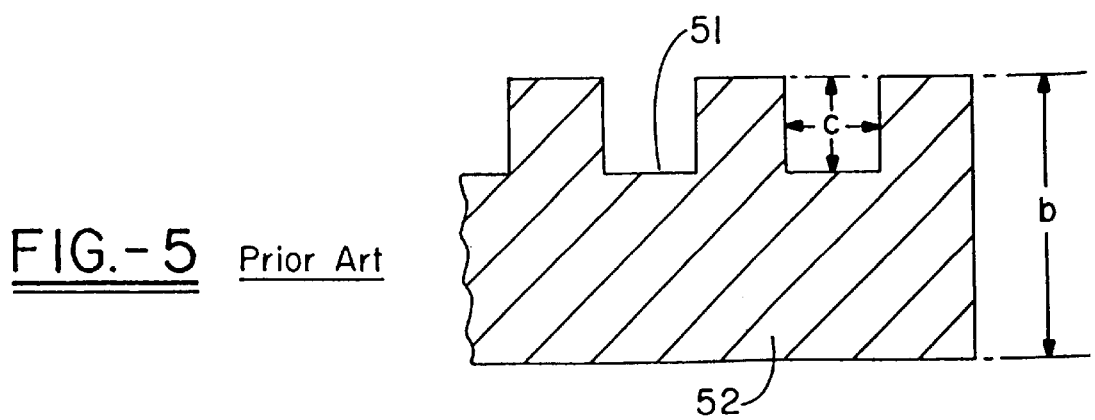
FIG. 5 is a partially schematic sectional side view of a cross flow layer channel according to the prior art.

FIG. 4 depicts a porous electrode 13 having micro-channels 26 formed between columns 34 of electrode material. The width of the micro-channels is generally on the order of about 0.1 to about 0.5 mm, and the depth of the micro-channels is generally on the order of about 0.1 to about 0.5 mm, although the micro-channel can be as deep as the thickness of the electrode layer, if the electrode is formed on an adjacent layer such as the electrolyte or separator. As an example, for an electrode 13 having a thickness "a" of 0.5 mm, an effective micro-channel could be on the order of 0.15 mm×0.15 mm height×depth. Comparatively, the prior art, depicted in FIG. 5, provides crossflow channels 51 in metallic separators 52 having a thickness "b" on the order of 3 mm, in which the height and depth "c" of the crossflow channels are on the order of 1 mm×1 mm.

To begin operation of the electrochemical apparatus, the fuel cells 2 are heated by an outside heat source to near their operating temperature. Once the reaction is initiated, it sustains itself by producing sufficient heat to support the ongoing cell operations. At the same time, an electrical current flows through the stack by virtue of the oxygen ionization and neutralization within each cell. This electrical current, driven by the oxygen potential difference, is the electrical output energy. To produce useful quantities of electric power having a useful voltage, fuel cells 2 of the type shown in FIG. 1 are typically arranged in a series connected stack. Because each of the fuel cells 2 is so thin, up to hundreds of cells can be assembled in a single stack of reasonable physical size.

Respectively, a gaseous fuel 22 is supplied to fuel manifold 19 and an oxygen-bearing gas 24, such as air, is supplied to air manifold 21. The oxygen-bearing gas flows through pores (and micro-channels, if used) in the cathode 8, driven by the difference in the gas pressures in the manifold and outside the cathode 8. The oxygen becomes negatively ionized in the cathode 8 at or near the electrolyte 10. The electrolyte 10 is a good conductor of oxygen ions. Oxygen ions, thus, flow through the electrolyte 10 to reach the anode 12. At the anode 12, these ions give up their excess electrons to become oxygen atoms and molecules, fuel 22 flows through the porous anode (and micro-channels if used) and combines with the oxygen to form water (and other products if fuels other than hydrogen are used), releasing thermal energy.

At the stack level, the micro-channel cross-sectional area within each cell 2 can also be varied from fuel cell to fuel cell to improve the overall reactant balance within the stack. To illustrate, reactants enter the stack at one end The fuel manifold 19 has some finite pressure drop, so as reactant flows along the manifold, there is a graduation in pressure from one end of the stack to the other. For uniform electrodes, the gradient in pressure in the fuel manifold 19 results in a differential flow across each anode 12. However, the cross-section of the micro-channels 26 can be tailored such that the pressure drop (or resistance to flow) across each anode 12 compensates for the pressure drop within the fuel manifold 19, thereby enabling consistent reactant distribution from one end of the stack to the other. Reducing or increasing the number of micro-channels 26 can be used to produce the same effect.

In a stack with reactants being fed from the top, the pressure of reactants within the internal manifold will decrease progressively towards the bottom of the stack. To compensate for this decrease, the net cross-sectional area of the micro-channels 26 in each cell within the stack can be progressively increased from top to bottom. By increasing the net cross-sectional area from top to bottom, a generally even distribution of reactants across the stack height will result. To achieve a balanced distribution of reactants in other flow arrangements, for instance where fuel is fed from one end and oxygen bearing gas from the opposite end, the cross-sectional area of the micro-channels on the anode 12 and cathode 8 may be varied according to the direction of the flow. In a stack that receives fuel 22 from the bottom of the stack and oxygen bearing gas 24 from the top, the cross-sectional area of the cathode micro-channels in each cell would be increased from top to bottom, and the cross-sectional micro-channel area of the anode would be increased from bottom to top to balance the distribution of reactants across the stack.

Balanced flow distribution of reactants reduces thermal gradients within the cell 2. Reactant depleted areas produce less heat than reactant rich areas, thus, uniform reactant supplies across the cell 2 and stack reduce the thermal gradients.

Cells 2 incorporating the varied micro-channel 26 are preferably symmetrical about a central access. Oval, circular, or other symmetrical shapes offer good performance. Most preferably, the cell's major surface will have a circular shape with central feed holes. The central feed design facilitates uniform reactant flow distribution and allows high reactant utilization rates.

As can be appreciated, an almost infinite number of pattern configurations are possible. It should further appreciated that while the above description is made with reference to a planar fuel cell, the present invention will include non-planar configurations including but not limited to tubular fuel cells. Therefore, the above pattern is presented as an example only and does not limit the scope of the claimed invention.

Other embodiments of the solid oxide fuel cell and its components are disclosed in U.S. Pat. Nos. 5,445,903 and 5,589,285, assigned to the common assignee of the present invention, which patents are hereby incorporated by reference as if fully written out below.

It should now be apparent that various embodiments of the present invention accomplish the objects of this invention. It should be appreciated that the present invention is not limited to the specific embodiments described above, but includes variations, modifications, and equivalent embodiments defined by the following claims.

What is claimed is:

1. An electrochemical apparatus comprising:
    a plurality of cells forming a stack; wherein each cell has a solid electrolyte disposed between an oxygen electrode and a fuel electrode, and at least one separator contacting the surface of one of the electrodes opposite the electrolyte; wherein in substantially each cell, at least one electrode defines a variable cross-sectional area micro-channel pattern; and,
    further comprising at least one reactant passage formed within said stack; a feed tube for providing reactants located at one end of said stack and registerable with said reactant passage; wherein said micro-channel cross-sectional area increases progressively distal within the stack from said feed tube.

2. The electrochemical apparatus of claim 1 wherein the micro-channel cross-sectional area is adapted to control reactant pressure distribution in the stack.

3. The electrochemical apparatus of claim 1 wherein the micro-channel pattern is formed within the electrode by screen printing.

4. The electrochemical apparatus of claim 1 wherein the micro-channel pattern is formed within the electrode by photolithography.

5. The electrochemical apparatus of claim 1 wherein the micro-channel pattern is formed within the electrode by pressing or calendering.

6. An electrochemical apparatus comprising:
    at least one cell having a solid electrolyte disposed between an oxygen electrode and a fuel electrode, and at least one separator contacting the surface of one of the electrodes opposite the electrolyte; a plurality of columns extending from at least one surface of at least one of the electrodes or the electrolyte or the separator; said columns defining variable cross-section micro-channels therebetween, and wherein each of said columns have a width, said width increasing in outward radially expanding rows.

7. The electrochemical apparatus of claim 6 wherein said micro-channels narrow radially outwardly from the cell center.

8. The electrochemical apparatus of claim 6 wherein said columns are arranged in a plurality of radially expanding rows, wherein said rows are adapted to radially outwardly narrow said micro-channels.

9. The electrochemical apparatus of claim 6 wherein the micro-channel pattern is formed within the electrode by screen printing.

10. The electrochemical apparatus of claim 6 wherein the micro-channel pattern is formed within the electrode by photolithography.

11. The electrochemical apparatus of claim 6 wherein the micro-channel pattern is formed within the electrode by pressing.

12. The electrochemical apparatus of claim 6 wherein the micro-channel pattern is formed within the electrode by calendering.

13. An electrochemical apparatus comprising:
at least one circular cell having a cell rim, wherein said cell has a solid electrolyte layer disposed between an oxygen electrode layer and a fuel electrode layer, and at least one separator layer contacting the surface of one of the electrodes opposite said electrolyte; wherein each of the layers define at least one air hole and at least one fuel hole and wherein the respective holes within each layer are registerable with one another and define generally central internal air and fuel manifolds; wherein at least one layer has a plurality of circular columns extending longitudinally outwardly from the respective air or fuel manifold defining a micro-channel pattern.

14. The electrochemical apparatus of claim 13 wherein the columns are formed within the electrode by screen printing.

15. The electrochemical apparatus of claim 13 wherein the columns are formed within the electrode by photolithography.

16. The electrochemical apparatus of claim 13 wherein the micro-channel pattern is formed within the electrode by pressing or calendering.

17. The electrochemical apparatus of claim 13, wherein said columns are arranged in radially expanding rows; and wherein an increasing number of columns extend from said at least one layer in each of said rows, such that said columns define a variable cross-section micro-channel that narrows toward the cell rim.

18. An electrochemical apparatus comprising:
at least one fuel cell; wherein the cell has a solid electrolyte disposed between an oxygen electrode and a fuel electrode, and at least one separator contacting the surface of one of the electrodes opposite the electrolyte; wherein the cell defines at least one air manifold and at least one fuel manifold located substantially centrally within the cell; wherein at least one electrode defines a micro-channel pattern in communication with one respective air or fuel manifold, wherein at least two of said fuel cells are mounted to each other forming a fuel cell stack; wherein at least one of said cells defines a variable cross-section micro-channel within at least one cell layer; and, wherein the cell micro-channel net cross-sectional area increases in the direction of reactant flow through the stack.

19. The electrochemical apparatus of claim 18 wherein the micro-channel pattern is formed within the electrode by photolithography.

20. The electrochemical apparatus of claim 18 wherein the micro-channel pattern is formed within the electrode by screen printing.

21. The electrochemical apparatus of claim 18 wherein the micro-channel pattern is formed within the electrode by pressing or calendering.

22. The electrochemical apparatus of claim 18 wherein the micro-channel has a width of up to about 0.5 mm.

23. The electrochemical apparatus of claim 18 wherein the cell has a thickness between about 1 mm and about 2 mm.

24. The electrochemical apparatus of claim 18 wherein the cell has a generally circular planar shape.

25. The electrochemical apparatus of claim 24 wherein the cell has a diameter between about 50 mm and about 80 mm.

26. An electrochemical apparatus comprising:
at least one fuel cell; wherein the cell has a solid electrolyte disposed between an oxygen electrode and a fuel electrode, and at least one separator contacting the surface of one of the electrodes opposite the electrolyte; wherein the cell defines at least one air manifold and at least one fuel manifold located substantially centrally within the cell; wherein at least one electrode defines a constant cross-section micro-channel pattern in communication with one respective air or fuel manifold; wherein the constant cross-section micro-channel pattern is defined by a plurality of columns extending axially from the electrode, and wherein said columns have a diameter of up to about 1 mm.

27. The electrochemical apparatus of claim 26 wherein the height of said columns is about 0.1 mm to about 0.5 mm.

28. The electrochemical apparatus of claim 26 wherein the micro-channel pattern is formed within the electrode by photolithography.

29. The electrochemical apparatus of claim 26 wherein the micro-channel pattern is formed within the electrode by screen printing.

30. The electrochemical apparatus of claim 26 wherein the micro-channel pattern is formed within the electrode by pressing or calendering.

31. The electrochemical apparatus of claim 26 wherein the micro-channel has a width of up to about 0.5 mm.

32. The electrochemical apparatus of claim 26 wherein the cell has a thickness between about 1 mm and about 2 mm.

33. The electrochemical apparatus of claim 26 wherein the cell has a generally circular planar shape.

34. The electrochemical apparatus of claim 33 wherein the cell has a diameter between about 50 mm and about 80 mm.

35. In a process for the fabrication of a solid oxide fuel cell comprising at least one cell having a cell rim, wherein said cell has a solid electrolyte layer disposed between an oxygen electrode layer and a fuel electrode layer, and at least one separator layer contacting the surface of one of the electrodes opposite said electrolyte; wherein each of the layers define at least one air hole and at least one fuel hole and wherein the respective holes within each layer are registerable with one another and define generally central internal air and fuel manifolds; the improvement including:
providing reactant micro-channels in at least one layer, said micro-channels having a width of not more than about 0.5 mm; wherein said micro-channels are provided by depositing a selected pattern into the surface of at least one layer; wherein electrode material is deposited on at least one layer selected from the group consisting of at least one electrode, the electrolyte and the separator, including forming rows of columns of electrode material defining the micro-channel arranged in a plurality of radially expanding rows; and wherein each of said columns have a width, said width increasing in outward radially expanding rows.

36. The process of claim 35 wherein said depositing is selected from the group consisting of screen printing, stenciling, photolithography, and airbrush painting.

37. The process of claim 35 wherein said rows are adapted to radially outwardly narrow said micro-channels.

38. The process of claim 35 wherein said columns have a diameter of up to about 1 mm.

39. The process of claim 35 wherein the height of said columns is about 0.1 mm to about 0.5 mm.

40. The process of claim 35 including forming said micro-channels and varying the cross-sectional area of the micro-channels along the micro-channel length.

41. The process of claim 40 wherein said micro-channels narrow radially outwardly from the cell center.

42. In a process for the fabrication of a solid oxide fuel cell comprising at least one cell having a cell rim, wherein said cell has a solid electrolyte layer disposed between an oxygen electrode layer and a fuel electrode layer, and at least one separator layer contacting the surface of one of the electrodes opposite said electrolyte; wherein each of the layers define at least one air hole and at least one fuel hole and wherein the respective holes within each layer are registerable with one another and define generally central internal air and fuel manifolds; the improvement including:

providing reactant micro-channels in at least one layer, said micro-channels having a width of not more than about 0.5 mm; wherein said micro-channels are provided by depositing a selected pattern into the surface of at least one layer; wherein electrode material is deposited on at least one layer selected from the group consisting of at least one electrode, the electrolyte and the separator, including forming rows of columns of electrode material defining the micro-channel arranged in a plurality of radially expanding rows including arranging a plurality of circular columns extending longitudinally outwardly from the respective air or fuel manifold on at least one layer.

43. The process of claim 42 wherein said depositing is selected from the group consisting of screen printing, stenciling, photolithography, and airbrush painting.

44. The process of claim 42 wherein said rows are adapted to radially outwardly narrow said micro-channels.

45. The process of claim 42, wherein said columns have a diameter of up to about 1 mm.

46. The process of claim 42, wherein the height of said columns is about 0.1 mm to about 0.5 mm.

47. The process of claim 42 including forming said micro-channels and varying the cross-sectional area of the micro-channels along the micro-channel length.

48. The process of claim 47 wherein said micro-channels narrow radially outwardly from the cell center.

* * * * *